United States Patent
Reiter

(12) United States Patent     (10) Patent No.: US 7,497,391 B2
Reiter     (45) Date of Patent: Mar. 3, 2009

(54) FUEL INJECTOR

(75) Inventor: Ferdinand Reiter, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/597,342

(22) PCT Filed: Feb. 22, 2005

(86) PCT No.: PCT/EP2005/050752

§ 371 (c)(1), (2), (4) Date: Nov. 21, 2006

(87) PCT Pub. No.: WO2005/113974

PCT Pub. Date: Dec. 1, 2005

(65) Prior Publication Data

US 2007/0221171 A1     Sep. 27, 2007

(30) Foreign Application Priority Data

May 21, 2004 (DE) .................. 10 2004 025 079

(51) Int. Cl.
*F02M 61/20* (2006.01)

(52) U.S. Cl. ............. 239/533.9; 239/585.4; 239/585.5; 251/263; 251/129.21; 251/337; 251/129.14; 219/616

(58) Field of Classification Search ............. 137/535, 137/540, 541; 251/337, 126.3, 129.21, 129.14; 123/470, 472; 239/585.4, 585.5, 533.9; 219/616
See application file for complete search history.

(56) References Cited

U.S. PATENT DOCUMENTS

| | | | | |
|---|---|---|---|---|
| 2,721,053 A | * | 10/1955 | Fry | 251/263 |
| 3,336,942 A | * | 8/1967 | Keith et al. | 137/529 |
| 4,827,975 A | * | 5/1989 | Steiger | 137/537 |
| 4,984,744 A | * | 1/1991 | Babitzka et al. | 239/585.4 |
| 5,104,091 A | * | 4/1992 | Rathay et al. | 251/129.14 |
| 5,217,204 A | * | 6/1993 | Maier et al. | 251/337 |
| 5,360,197 A | * | 11/1994 | Reiter et al. | 251/129.21 |
| 5,494,223 A | * | 2/1996 | Hall et al. | 239/585.5 |
| 5,520,338 A | * | 5/1996 | Lohmann | 239/533.9 |
| 5,580,479 A | * | 12/1996 | Bruns | 219/616 |

FOREIGN PATENT DOCUMENTS

| | | |
|---|---|---|
| DE | 41 25 155 | 2/1993 |
| DE | 203 10 171 | 9/2003 |

* cited by examiner

*Primary Examiner*—Stephen K Cronin
*Assistant Examiner*—Keith Coleman
(74) *Attorney, Agent, or Firm*—Kenyon & Kenyon LLP

(57) ABSTRACT

A fuel injector for fuel-injection systems of internal combustion engines includes a valve-closure element cooperating with a valve seat, and a restoring spring which is situated in a spring pocket opening and acts upon the valve-closure element by a restoring force in the direction of the valve seat. The restoring spring has at least one holding coil in a region of the inflow side, whose area of cross section is positioned perpendicular to an area of cross section of the restoring spring.

7 Claims, 2 Drawing Sheets

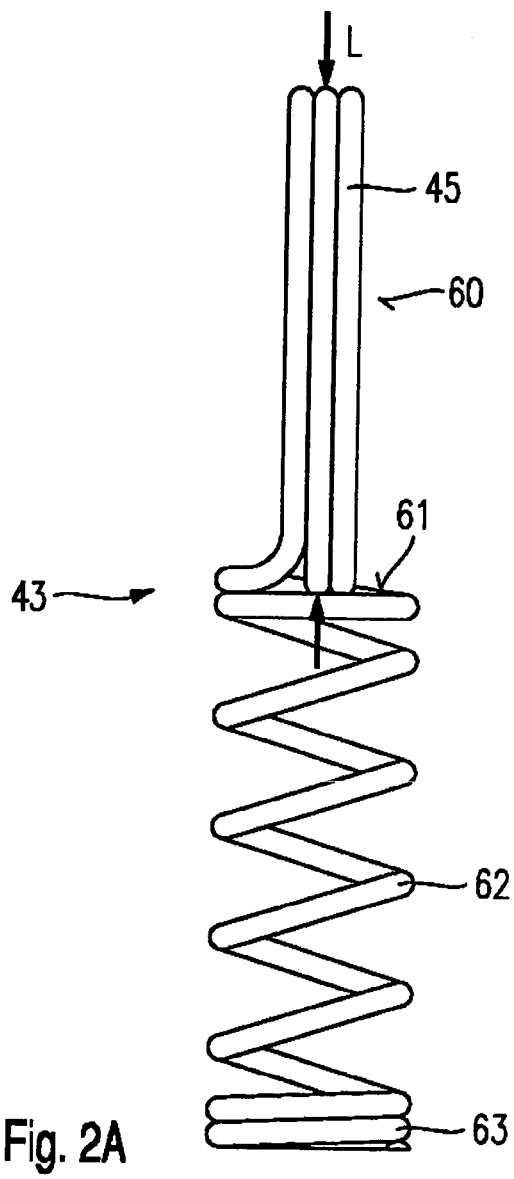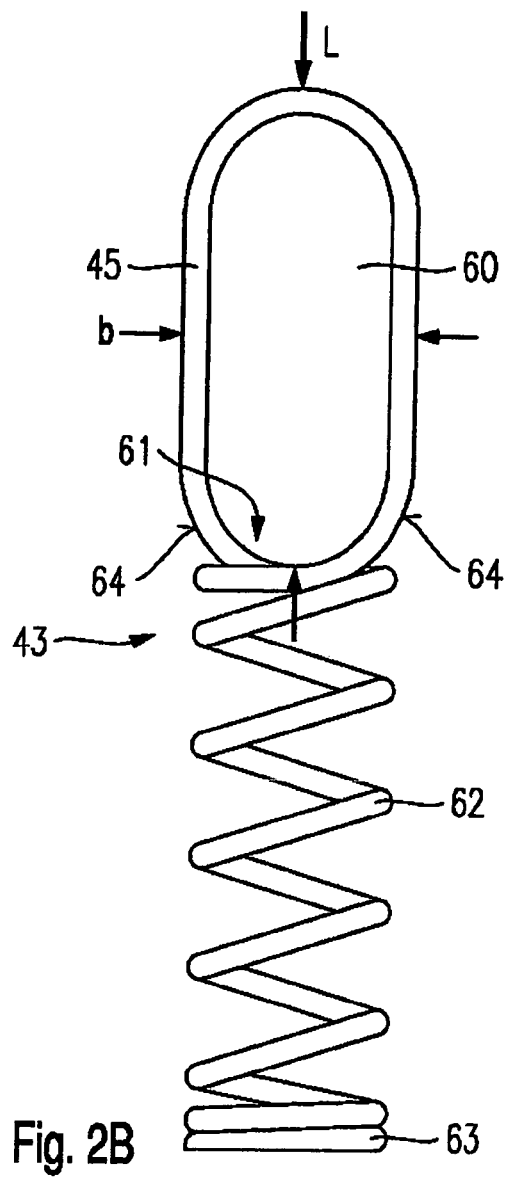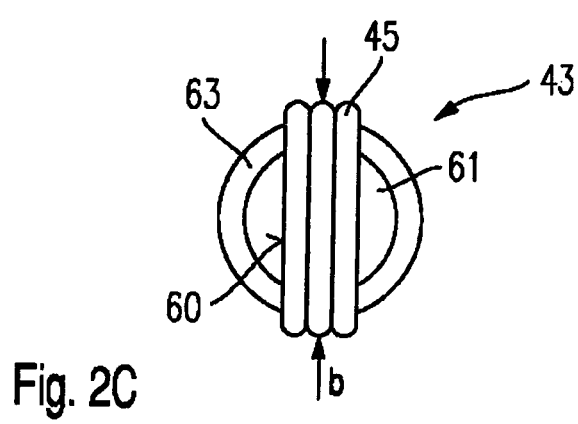

FUEL INJECTOR

FIELD OF THE INVENTION

The present invention relates to a fuel injector.

BACKGROUND INFORMATION

In conventional fuel injectors, an adjustment sleeve on which a restoring spring is braced that acts on the valve-closure member is pressed into a spring pocket opening. When pressing the adjustment sleeve in, there is the danger that shavings will form on the adjustment sleeve and on the wall of the spring pocket opening.

German Patent No. DE 41 25 155 describes a fuel injector in which the restoring spring is pressed into a spring pocket opening and retained in the spring pocket opening by radially directed tension. The pressing-in depth of the restoring spring defines the magnitude of the spring force acting on the valve-closure element. The diameter of the restoring spring in an active spring region is smaller than that of the spring pocket opening, while the diameter of a cylindrical clamping region facing away from the valve-closure element is larger than that of the spring pocket opening.

A particular disadvantage of the construction having a self-clamping spring described in German Patent No. 41 25 155 is the high installation force. Moreover, it is possible that the spring packet will be displaced from its intended position in response to miniscule, asymmetrically applied forces and be positioned in the receiving bore in a lopsided manner. The correct functioning of the fuel injector will then no longer be ensured since the spring force acting on the valve-closure element may vary.

SUMMARY

A fuel injector according to an example embodiment of the present invention may have the advantage that, next to the flexible coils of the restoring spring, a plurality of coils are wound in such a way that the coil's area of cross section is positioned perpendicular to that of the flexible coils.

This makes it possible to ensure that, first of all, the installation force to be applied for correct positioning of the restoring spring is relatively low so that the risk of shavings is low as well. Furthermore, there is no longer the danger of tilting of the holding coils in the spring pocket opening and subsequent malfunction of the fuel injector.

In an example embodiment, the holding coils advantageously have an oval or elliptical design.

Furthermore, it may be advantageous if the number of holding coils is three or more.

It may also be advantageous if the width of the oval or elliptical holding coils is greater than that of the spring receiving bore of the fuel injector, so that a reliable clamping effect is ensured.

BRIEF DESCRIPTION OF THE DRAWINGS

An exemplary embodiment of the present invention is shown in simplified form in the figures and explained in greater detail below.

FIGS. 2A-C show different views of a restoring spring for a fuel injector, configured according to the present invention, according to FIG. 1.

DETAILED DESCRIPTION OF EXAMPLE EMBODIMENTS

Figure 1:
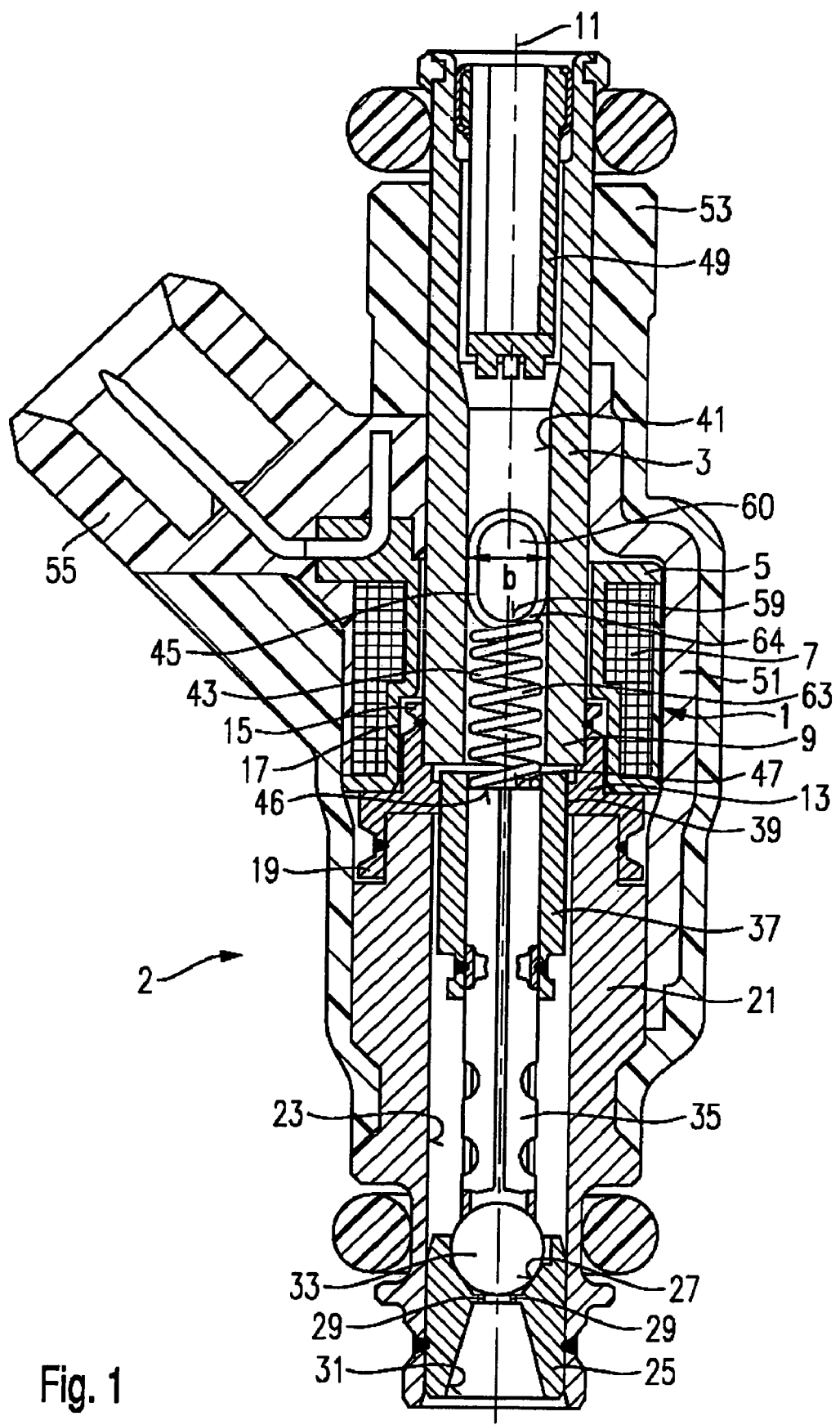
FIG. 1 shows a schematic section through an exemplary embodiment of a fuel injector configured according to the present invention, in a schematic, part-sectional view.

An exemplary embodiment of the present invention is described in the following by way of example. In this context identical components have been provided with matching reference numerals in all of the figures.

FIG. 1 shows an exemplary, electromagnetically actuable fuel injector 2 for fuel-injection systems of mixture-compressing internal combustion engines having externally supplied ignition. Fuel injector 2 includes an inner pole 3, which is surrounded by a solenoid coil 1 and used as fuel intake nipple. Solenoid coil 1 has a coil body 5 which is stepped in the radial direction, and it has a coil 7 which is stepped in the radial direction and, together with inner pole 3 having a constant outer diameter, allows for an especially compact design of fuel injector 2.

With the aid of welding, a tubular intermediate part 13 is sealingly connected to a lower pole end 9 of inner pole 3 in a concentric manner with respect to a longitudinal valve axis 11, in part axially surrounding pole end 9 via an upper cylinder section 15. Stepped coil body 5 partially overlaps inner pole 3, and it overlaps upper cylinder section 15 of intermediate part 13 by a step 17 having a larger diameter. At its end facing away from inner pole 3, intermediate part 13 has a lower cylinder section 19, which overlaps a tubular nozzle holder 21 and is joined thereto by welding, for example. A cylindrical valve-seat body 25 is sealingly mounted by welding to the downstream end of nozzle holder 21 in a through hole 23 running concentrically with respect to longitudinal valve axis 11. In the direction of solenoid coil 1, valve-seat body 25 has a fixed valve seat 27 in the exemplary embodiment, downstream from which two spray-discharge orifices 29 are formed in valve-seat body 25. A conditioning bore 31, which, for instance, frustoconically widens in the flow direction, is formed in valve-seat body 25 downstream from spray-discharge orifices 29.

Fixed valve seat 27 cooperates with a valve-closure element 33, which has a spherical design, for instance, and is used to open and close the fuel injector. Via its end facing away from fixed valve seat 27, valve-closure element 33 is joined to a tubular valve needle 35 by welding, for example. At its other end, which faces away from valve-closure element 33, valve needle 35 is joined to a tubular armature 37 by welding, for instance. At its periphery, armature 37 is guided by a guide collar 39 of intermediate part 13. A restoring spring 43, which extends in the region of pole end 9, for example, is pressed into a continuous, stepped spring pocket opening 41 of tubular inner pole 3, which extends concentrically to longitudinal valve axis 11 and is used to supply the fuel in the direction of valve seat 27. In the exemplary embodiment, restoring spring 43 is designed as helical spring, for example, made from wire having a circular cross section. Restoring spring 43 may be made from, for instance, a brass wire, a spring steel wire or from any other wire.

Via its spring front end 46, which faces fixed valve seat 27, restoring spring 43 rests against a front end 47 of valve needle 35 facing away from valve-closure element 33, and acts upon valve-closure element 33 in the direction of fixed valve seat 27. The pressing-in depth of restoring spring 43 into spring pocket opening 41 of inner pole 3 defines the spring force of restoring spring 43 and thereby influences the dynamic fuel quantity supplied during the opening and closing stroke of fuel injector 2.

Inside stepped spring pocket opening 41 of inner pole 3, upstream from restoring spring 43, a fuel filter 49 is positioned in a direction facing away from pole end 9. Solenoid coil 1 is surrounded by at least one conductive element 51, which has a bracket-type form, for instance, is used as ferromagnetic element and surrounds the solenoid coil at least partially in the circumferential direction; by its one end, it rests against inner pole 3 and by its other end it rests against nozzle holder 21 to which it is joined by welding or soldering, for example. A portion of fuel injector 2 is preferably extrusion-coated by a plastic coat 53, which extends in the axial direction from inner pole 3 across solenoid coil 1 and across the at least one conductive element 51, and onto which an electrical connection plug 55 is extruded on as well.

A particular disadvantage of conventional fuel injectors 2 is that, although restoring spring 43 is designed such that it is able to be retained in spring pocket opening 41 without additional sleeve, the risk of shavings forming on the wall of spring pocket opening 41 is present in this case as well. This is a result of the larger diameter of holding coils 45, which necessitates a high installation force for restoring spring 43. Thus, the advantage of dispensing with the sleeve is no longer provided since the restoring spring also causes shavings to form when being pressed into spring pocket opening 41.

In contrast, in the exemplary embodiment shown in FIG. 1, restoring spring 43 according to the present invention has at least one holding coil 45, which is formed at an end 59 of restoring spring 43 facing away from valve-closure element 33, and which has a larger outer diameter than the diameter of spring pocket opening 41. As a result, restoring spring 43 rests against the wall of spring pocket opening 41 under a stress acting in the radial direction. Compared to an area of section 61 of restoring spring 43, an area of section 60 of the at least one holding coil 45 has a perpendicular design.

The measures according to the present invention are shown in FIGS. 2A through 2C and explained in detail below.

FIG. 2A shows a restoring spring 43 in a schematic view, the view being directed toward the side of holding coils 45, of which there are three in the exemplary embodiment.

FIG. 2B shows a view of restoring spring 43 rotated by 90°, from which an oval or elliptical coil form of holding coils 45 can be gathered. In the non-tensioned state of holding coils 45, in the unmounted state of restoring spring 43, a width b of holding coils 45 is greater than the diameter of spring pocket opening 41. During installation of restoring spring 43 into spring pocket opening 41, holding coils 45 are plastically-elastically deformed and clamped inside spring pocket opening 41 in the process, so that they are able to absorb the spring force without additional adjustment sleeve.

FIG. 2C shows restoring spring 43 and holding coils 45 in a plan view in the flow direction of the fuel. It can be gathered from FIG. 2C that holding coils 45 are centrically positioned above cross section 61 of restoring spring 43.

Furthermore, the larger outer diameter b of holding coils 45 is able to be seen.

A restoring spring 43 designed according to FIGS. 2A through 2C has a variety of advantages. First, no separate adjustment sleeve is required. In addition, holding coils 45 are unable to tilt when loaded, but instead rest against the wall of spring pocket opening 41 in a stable manner. Given a suitable design of holding coils 45, for instance by adapting the number, width b as well as length L of holding coils 45, the holding force may be adapted to the requirements in an uncomplicated manner.

Furthermore, it is advantageous that, if necessary, the spring can be removed again from spring pocket opening 41 without any problems, using a hook. This is impossible or very difficult with conventional restoring springs 43 according to the related art, for instance. The pronounced asymmetry of restoring spring 43 allows uncomplicated automatic feeding during installation. Furthermore, no shavings will form since the round spring wire of restoring spring 43 contacts the wall of spring pocket opening 41 in only one extension direction of holding coils 45.

As can be gathered from FIGS. 2A and 2B, a flexible portion 62 of restoring spring 43 has two mutually abutting end coils 63 at both ends, for instance, in order to prevent restoring springs 43 from getting snagged during production as bulk material. Furthermore, end coils 63 ensure that the adjustment and spring force from holding coils 45 is able to be transmitted in the axial direction, without lateral offsets.

In addition, an insertion bevel 64 may be formed at the transition from flexible coils 62 to holding coils 45 so as to facilitate the insertion of restoring spring 43 into spring pocket opening 41 and to prevent the formation of shavings.

The present invention is not restricted to the exemplary embodiment shown but suitable for various designs of fuel injectors 2. In particular, any combination of the individual features is possible.

What is claimed is:

1. A fuel injector for a fuel-injection system of an internal combustion engine, comprising:
   a valve-closure element cooperating with a valve seat;
   a restoring spring positioned in a spring pocket opening, the restoring spring configured to act upon the valve-closure element by a restoring force in a direction of the valve seat, wherein the restoring spring has at least one holding coil in a region on an inflow side, the holding coil having an area of cross section that is positioned perpendicular to an area of cross section of the restoring spring;
   wherein the area of cross section of the at least one holding coil has an oval or elliptical form.

2. The fuel injector as recited in claim 1, wherein the at least one holding coil includes at least three holding coils.

3. The fuel injector as recited in claim 1, wherein a width of the at least one holding coil is greater in an unmounted state of the restoring spring than an inner diameter of the spring pocket opening.

4. The fuel injector as recited in claim 3, wherein the at least one holding coil is plastically-elastically deformed in the spring pocket opening in a mounted state.

5. The fuel injector as recited in claim 1, wherein flexible coils of the restoring spring have at least two mutually abutting end coils on both sides.

6. The fuel injector as recited in claim 5, wherein the at least one holding coil is braced against the end coils of the flexible coils.

7. The fuel injector as recited in claim 5, wherein an insertion bevel is formed between the flexible coils and the at least one holding coil.

* * * * *